July 10, 1951      W. BROWN      2,560,154
CONTROL LEVER MECHANISM
Filed April 2, 1949      2 Sheets-Sheet 1
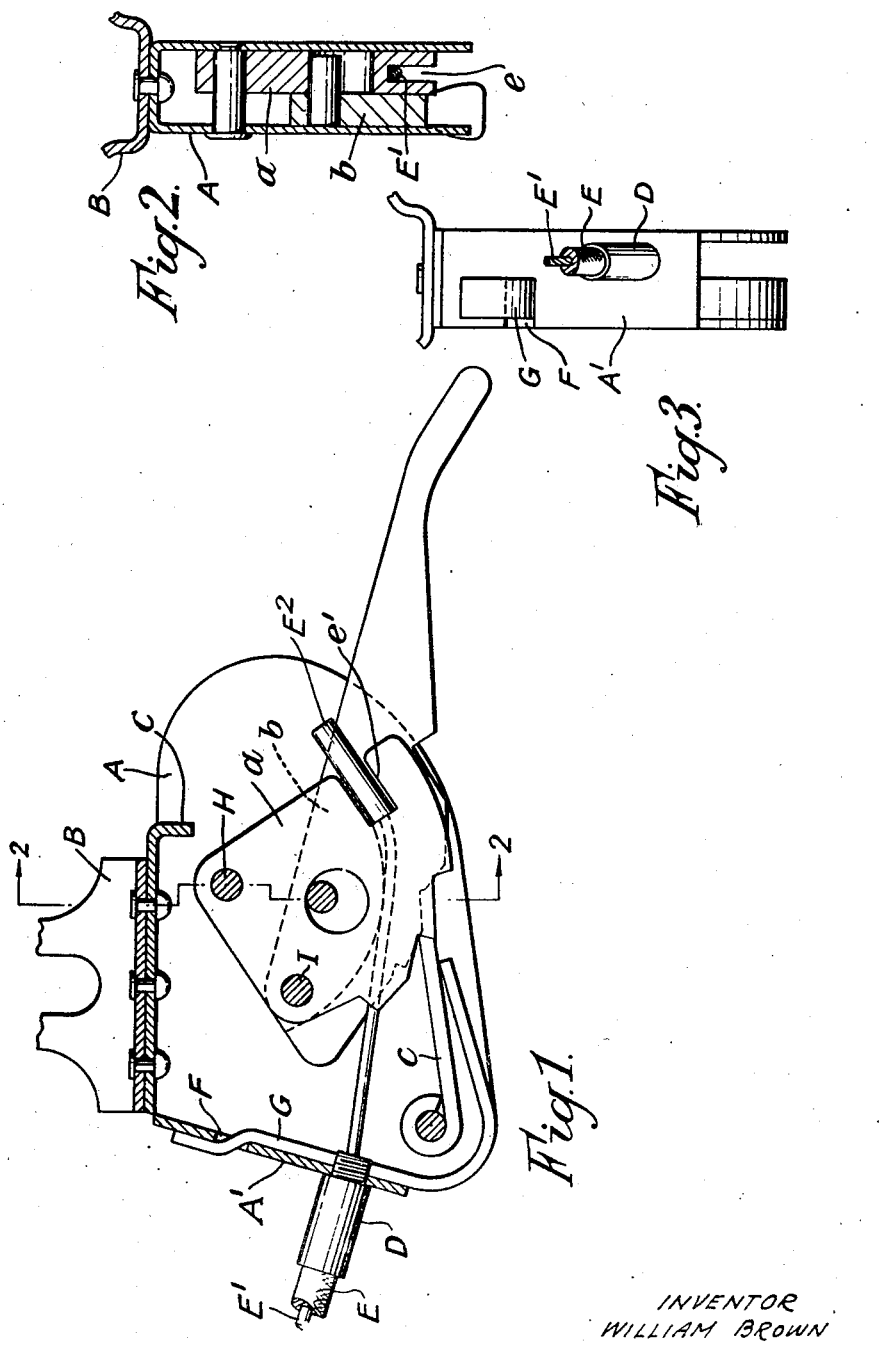
INVENTOR
WILLIAM BROWN
ATTORNEY July 10, 1951        W. BROWN        2,560,154
CONTROL LEVER MECHANISM
Filed April 2, 1949        2 Sheets—Sheet 2
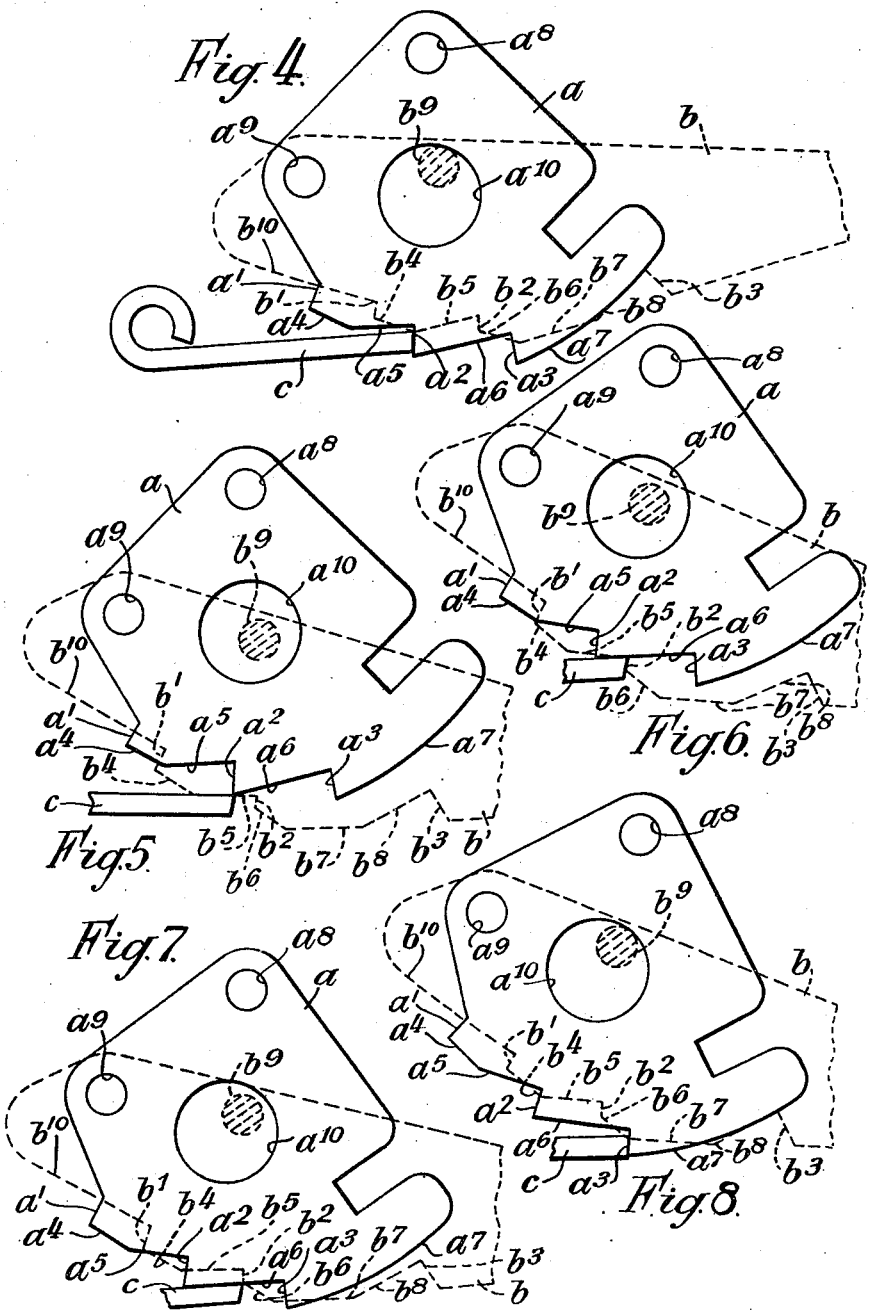
INVENTOR
WILLIAM BROWN
BY
ATTORNEY Patented July 10, 1951

2,560,154

UNITED STATES PATENT OFFICE 2,560,154

CONTROL LEVER MECHANISM

William Brown, Nottingham, England

Application April 2, 1949, Serial No. 85,199
In Great Britain April 26, 1948

4 Claims. (Cl. 74—487)

This invention relates to a control lever mechanism of the kind which is adapted to be set in two or more alternative positions, as for example to control through a flexible cable the setting of the selector mechanism of a variable speed gear of a bicycle.

The present invention is an improvement of an already known construction of control lever comprising a bracket, a stepped quadrant pivoted thereto, a spring-loaded pawl adapted to engage the steps of the said quadrant, means for attaching to the quadrant an operated member, (such as a cable) and means for turning the said quadrant about its pivot so as to draw on, or release, the operated member, such latter means consisting of a second or operating stepped quadrant with a manually operable handle or extension, and a pin-and-aperture connection between the two quadrants permitting limited relative movement and so arranged that in the normal position the steps of the periphery of the second or operating quadrant are below the periphery of the first quadrant, permitting normal ratchet engagement of the pawl with such first quadrant during movement to draw on the operated member and so that upon movement of the operating quadrant in the other direction, while the first quadrant is held by the pawl, the second or operating quadrant moves to project its stepped edge relatively beyond that of the first quadrant so as ultimately to lift the pawl out of engagement with the step in the first quadrant while presenting one of its steps for engagement by the pawl, such step being so placed relative to the steps of the first quadrant that it holds against the pawl until return of the operating quadrant to its normal position relative to the first quadrant, which movement withdraws such step relative to the first quadrant and finally disengages from the pawl, leaving such pawl against the periphery of the first quadrant and ready for engagement by the next step on the first quadrant as the latter is pulled round by the operated member, whereby the first quadrant can only move to bring such next step into engagement with the pawl. For such withdrawal of the steps of the operating quadrant to below the periphery of the first quadrant for disengagement from the pawl it follows that the top of each step of the operating quadrant must normally be below or level with that of the first quadrant.

The aforesaid construction is hereinafter described as "the kind referred to."

In the manufacture and use of the cable control lever mechanism of the kind referred to, certain problems have arisen. In particular there was a tendency when used as a change speed control lever on a bicycle, for the lever to rattle when subjected to the normal vibration of the bicycle frame or handlebars, unless the stepped contours of the two quadrants were finished with a high degree of relative similarity as will be explained later, while owing to the fact that such contours, between the steps, were arcuate the view-room operation to ensure the required degree of accuracy was not as simple as is desirable for an article to be produced in substantial numbers.

The object of the present invention is a simple and improved construction of control lever of the kind aforesaid to meet the aforesaid problems.

The invention is based upon an appreciation of the fact that the relative contours of the first stepped quadrant member or ratchet plate, and of the operating quadrant may, by being given a proportional dissimilarity, provide a solution to the problems aforesaid.

According to the invention a control lever mechanism of the kind referred to is characterised in that the stepped portion of the operating quadrant is made of such dissimilar proportions relative to the first quadrant that when the operating quadrant is in its normal position its periphery at the base of each step of the first quadrant is above that of the first quadrant so as to be engaged by and determine the inward position of the pawl while the pawl is engaged with any one step face in the first quadrant, whereby the pawl holds the operating quadrant at the extreme normal position of pin-and-aperture engagement relative to the first quadrant to prevent vibration while the step face of the first quadrant engaged with the pawl determines in known manner the angular position of such quadrant about its pivot.

According to a second feature of the invention the portions of the stepped contours of the quadrants, immediately preceding and intermediate of the steps, each consists of a plurality of flat (non-arcuate) surfaces to simplify manufacture and viewing.

In the accompanying drawings—

Fig. 1 is a part sectional elevation of one example of a control lever mechanism made in accordance with a 4-speed hub gear for a bicycle;

Fig. 2 is a sectional end elevation, and

Fig. 3 is a rear end elevation of the construction shown in Fig. 1;

Figs. 4, 5, 6, 7 and 8 are diagrammatic views showing the parts in different stages during a sequence of movements.

In the example shown in Figs. 1 to 3 of the drawing the control lever mechanism comprises a bracket A which is a U-shaped metal pressing to the base of which is riveted a clip B for attachment to the handlebar of the bicycle or to a tube of the bicycle frame, not shown, such bracket having a nose C the action of which is described later. At the back edge the bracket is partly closed by a tongue A' bent across from one of the sides of the brackets and formed with a hole for the anchorage nipple D of the outer casing E of the flexible cable E', and also having a notch F for the end of a spring G of the actuating pawl c. In the bracket A is a pivot pin H on which is mounted a stepped quadrant $a$ to one side of which first quadrant is pivoted at $a^9$ on the stud I an operating quadrant $b$, as described below in more detail.

As shown in Figs. 4 to 8 the first quadrant $a$ has three steps $a'$, $a^2$ and $a^3$, the intermediate portions of its periphery between such steps consisting of one or more straight surfaces; these being respectively $a^4$ and $a^5$ between steps $a'$ and $a^2$ and $a^6$ between the steps $a_2$ and $a^3$. Such surfaces are functionally related to the operation of the device according to the invention as will be explained later and are also made straight instead of arcuate as heretofore, in order to simplify production, especially viewing and gauging. Beyond the step $a^3$ there is an arcuate extension $a^7$. This first quadrant has a pivot hole $a^8$ by which it will be pivotally mounted in its bracket, on the pin H a stud hole $a^9$ carrying a fixed pivot stud for the operating quadrant $b$ described later and a further stop-hole $a^{10}$ whose function is also described later. The peripheral edge of the quadrant $a$ is grooved at $e$ for the cable E' and notched at $e'$ for the nipple $E^2$ on the end of the cable.

Pivotally connected to the first quadrant on the stud I fixed in the hole $a^9$ is an operating quadrant, shown dotted to distinguish it from the quadrant $a$, having a lever-like extension $b$ and three steps $b'$, $b^2$ and $b^3$. This operating quadrant is shown in its normal position relative to the first quadrant and as will be seen the top edges of the steps $b'$ and $b^2$ are below the adjacent edges $a^5$ and $a^6$ of the first quadrant while such steps $b'$ and $b^2$ are also relatively intermediate of the steps $a'$ and $a^2$. The end step $b^3$ is, on the other hand, at all times above the arcuate portion $a'$. Between the steps $b'$, $b^2$ and $b^3$ the periphery of the quadrant has straight line surfaces respectively $b^4$ and $b^5$ between $b'$ and $b^2$; $b^6$, $b^7$ and $b^8$ between $b^2$ and $b^3$. Fixed in the operating quadrant is a locating stud $b^9$ which, as shown in Fig. 4, lies against one part of the stop-hole $a^{10}$ to determine the normal relative position of the quadrants. The edge of the operating quadrant in advance of the step $b'$ is designated $b^{10}$. The pawl $c$ is shown having its end face engaged with the step $a^2$ with its inner edge resting on the surface $b^4$ because the latter at that point is just above the surface $a^5$. Similarly it is to be noted that, immediately at the step $a^3$ the face $b^6$ is just above the face $a^6$. The pawl $c$ is shown engaged by the spring G which exerts an upward pressure urging the pawl towards the stepped edges of the quadrants. Because of these proportions, when the quadrants are in their normal relative position with the end of the pawl engaged with either of the steps $a'$, $a^2$ or $a^3$ of the first quadrant, a face $b^{10}$, $b^4$ or $b^6$ respectively on the operating quadrant $b$ determines the inward position of the pawl and therefore the spring pressure of the pawl presses on the operating quadrant $b$ so as to hold its stud $b^9$ against the hole $a^{10}$ as shown in Fig. 1 and prevents movement of the quadrant about its pivot in the hole $a^9$ thus eliminating rattle. Tension on the operating cable is tending to urge the first quadrant to pivot clockwise about its pivot hole $a^8$ so that the step $a^2$ in fact determines the angular position of the quadrant and thereby the actuation control of the mechanism.

In Fig. 5 the parts are shown with the operating quadrant moved to a first intermediate position for changing to engage the step $a^3$ with the pawl. The face $b^5$ is now beyond the step $a^2$ and has raised the pawl $c$ so that it has been disengaged. The parts do not stay in this position because tension on the cable causes the quadrants $a$ and $b$ to turn clockwise about the pivot hole $a^8$ bringing the step $b^2$ into engagement with the end of the pawl which engagement prevents further movement of the operating quadrant, such relative intermediate position being shown in Fig. 6. In this position tension on the cable is free to turn the first quadrant further in a clockwise direction about the pivot hole $a^8$ while the reaction force between the pawl $c$ and the step $b^2$ tends to turn the operating quadrant in a counter clockwise direction about the pivot hole $a^9$. When operating pressure in the clockwise direction is released from the lever $b$ or overcome by the said reaction force the tension on the cable causes slight further rotation of the quadrant $a$ at the same time, aided by the spring, pressure of the pawl causing the quadrant $b$ to move back towards its normal position relative to the quadrant $a$ so that the step $b^2$ comes level with the surface $a^6$, which position is shown in Fig. 7. The parts do not remain in such position because the tension on the cable is now free to turn the quadrant $a$ until the step $a^3$ engages the pawl, but as the quadrants move to this final position as shown in Fig. 8 the surface $b^6$ of the quadrant $b$ engages the edge of the pawl to lift it slightly off the face $a^6$ of the quadrant $a$. Thus, in such now position, the inward position of the pawl $d$ is now determined by the face $b^6$ while the angular position of the quadrant $a$ is determined by the step $a^3$ and the spring pressure of the pawl $c$ holds the quadrant $b$ so that its locating stud $b^9$ is again against the same face of the hole $a^{10}$. The stud $b^9$ and hole $a^{10}$ thus provide lost motion delimitation of relative movement of the quadrants. In the final position with the step $b^3$ engaged with the pawl such step determines also the angular position of the quadrant and it is possible to have such arrangement because it is the final step. Tension on the cable will hold the face of the stop-hole $a^{10}$ against the stud $b^9$ to maintain normal relative position of the quadrants and prevent vibratory movement.

What I claim is:

1. Control lever mechanism of the kind comprising a bracket, a stepped quadrant pivoted thereto, a spring-loaded pawl adapted to engage the steps of the said quadrant, means for attaching to the quadrant an operated member (such as a cable) and means for turning the said quadrant about its pivot so as to draw on, or release, the operated member, such latter means consisting of a second or operating stepped quadrant with a manually-operable handle or extension, and a pin-and-aperture connection between the two quadrants permitting limited relative movement and so arranged that in the normal position, the top of the steps of the periphery of the second or operating quadrant are below the periphery of the first quadrant, permitting normal ratchet engagement of the pawl with the steps of such first quadrant during movement to draw on the operated member and so that upon movement of the operating quadrant in the other direction, while the first quadrant is held by the pawl, the second or operating quadrant moves to project its stepped edge relatively beyond that of the first quadrant so as ultimately to lift the pawl out of engagement with the step of the first quadrant while presenting one of its steps for engagement with the pawl, such step being so placed relative to the steps of the first quadrant that it holds against the pawl until return of the operating quadrant to its normal position relative to the first quadrant, which movement withdraws such step relative to the first quadrant and finally disengages from the pawl, leaving such pawl against the periphery of the first quadrant and ready for engagement with the next step of the first quadrant as the latter is pulled round by the operated member, whereby a separate movement of the second quadrant is required to bring each step of the first quadrant into engagement with the pawl, characterised in that the stepped portion of the operating quadrant is made of such proportions relative to the first quadrant that when the operating quadrant is in its normal position its periphery at the base of each step of the first quadrant is beyond that of the first quadrant so as to be engaged by and determine the inward position of the pawl while the pawl is engaged with any one step face in the first quadrant, whereby the pawl holds the operating quadrant at the extreme normal position of pin-and-aperture engagement relative to the first quadrant to prevent movement, while the step face of the first quadrant engaged with the pawl determines in known manner the angular position of such quadrant about its pivot.

2. Control lever mechanism according to claim 1 further characterised in that the portions of the stepped contours of the quadrants immediately proceding and intermediate of the steps each consist of a plurality of flat (non-arcuate) surfaces.

3. Control lever mechanism according to claim 1 further characterised in that the operating quadrant is pivoted to the first quadrant at a point spaced away from the pivot attaching the first quadrant to the bracket and further removed than such latter pivot from the handle or lever end of the operating quadrant.

4. Control lever mechanism comprising a bracket adapted to be attached to a tubular member of a bicycle, a stepped quadrant pivotally mounted on said bracket, a spring-loaded pawl mounted on the bracket and adapted to engage the steps of the quadrant to define a plurality of positions of the quadrant, means for attaching an operated member (such as a cable) to the quadrant, and manually operable means for rotating said quadrant comprising a second or operating quadrant pivotally connected to the first quadrant at a point away from the pivot of such first quadrant to the bracket, steps on the operating quadrant relatively succeeding the steps on the first quadrant and contour portions of the operating quadrant preceding its steps, the periphery of the stepped portion of the operating quadrant being such that the quadrant can be moved about its pivot so that such periphery, in one position, is withdrawn behind, or in another position projects beyond the periphery of the first quadrant, pin-and-aperture means determining such first position, characterised in that in the rest position of the mechanism the contour portions of the operating quadrant are held just projecting beyond the contour of the first quadrant preceding its steps so that the pawl, while engaging any of the steps of the first quadrant, engages the corresponding preceding contour portions of the operating quadrant.

WILLIAM BROWN.

REFERENCES CITED

The following references are of record in the file of this patent:

FOREIGN PATENTS

| Number | Country | Date |
| --- | --- | --- |
| 498,820 | Great Britain | Jan. 10, 1939 |